April 26, 1932.  A. THOMA  1,855,780
SHOE FILLER PIECE
Filed Oct. 24, 1927
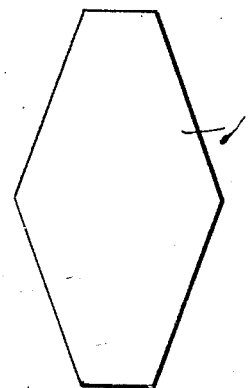
Fig. 1.
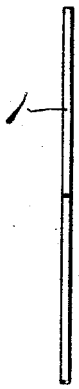
Fig. 2.
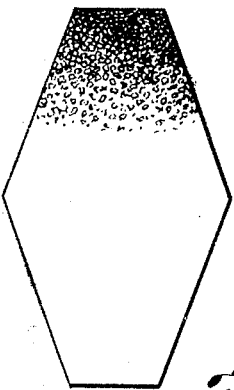
Fig. 3.
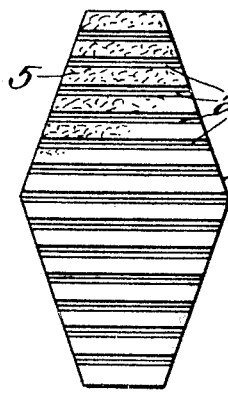
Fig. 11.
Fig. 15.
Fig. 4.
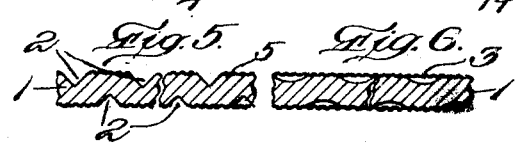
Fig. 5. Fig. 6.
Fig. 7.
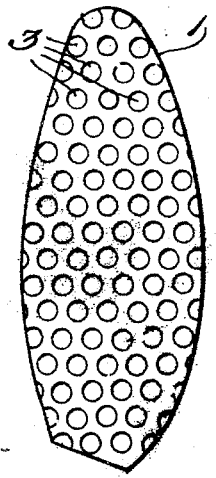
Fig. 12.
Fig. 8.
Fig. 9.
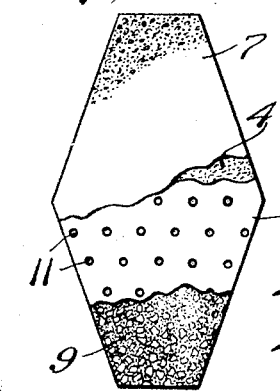
Fig. 13.
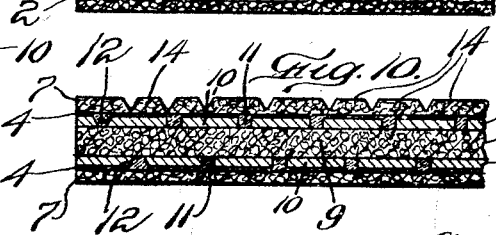
Fig. 10.
Fig. 14.
Inventor:
Andrew Thoma,
by Roberts, Cushman + Woodberry
attys.

Patented Apr. 26, 1932

1,855,780

UNITED STATES PATENT OFFICE

ANDREW THOMA, OF CAMBRIDGE, MASSACHUSETTS, ASSIGNOR TO NORTH AMERICAN CHEMICAL COMPANY, OF BOSTON, MASSACHUSETTS, A CORPORATION OF MASSACHUSETTS

SHOE FILLER PIECE

Application filed October 24, 1927. Serial No. 228,236.

My present shoe-bottom filler piece (although it may be made first in the form of a large sheet to be cut up into pieces later) is an improvement on the inventions disclosed in my applications Ser. No. 133,506 filed September 3, 1926, Ser. No. 183,302 filed April 13, 1927 and Ser. No. 192,076 filed May 17, 1927, and likewise in providing a central supporting body having an external coating for holding it in place in the shoe-bottom and preferably consisting of compressible, spreadable, or other recognized form of shoe-filler material. The aforesaid applications disclose sheet-like shoe filler pieces in which, if of the spreadable or plastic kind, the spreadable material is in the middle, to be squeezed out at the edges, and the supporting layer or layers on the outside, whereas in my present invention the filler piece has the spreadable material on the outside and the non-spreadable support or layer at the middle or center. The present invention, like the others of the same general description of the above mentioned three applications, although preferably including spreadable material is not limited thereto but in its simplest embodiment comprises a non-spreadable layer such as pasteboard, tar paper, sheet cork, felt or any similar sheet-like supporting substance, having an adjacent lamina in the form of a layer or coating which adapts it or converts it into a practical, durable and quickly applied shoe-bottom filler. Such a piece is claimed in the first mentioned application above in which the outside coating or lamina is adhesive (whether latent or active) and another species is claimed in the second application above limited to an external adhesive which is latent. The present application is subordinate to both of the last two mentioned applications and their claims, so far as having an external adhesive, and having the same latent (to be rendered active at the time of application to the shoe-bottom) being distinguished therefrom in having the adhesive layer provided thereon in profuse segregations, preferably in grooves, indentations or small areas, or otherwise so arranged as to be capable of uniting the filler piece directly and permanently to the outer sole or inner sole, or to both, as distinguished from a temporary adhesiveness simply for facilitating the process of sole laying or filler laying. In prosecuting my method of McKay filling as disclosed in the above applications and other concurrent applications, I have found unexpected advantage in not only the durability and economy of shoe manufacture but in speed and facility of filler laying by providing the filler pieces of such construction that they contain in themselves and preferably in copious quantities or segregated masses sufficient cement or cementitious substance to make absolutely certain that they will be permanently secured to the adjacent leather surface of the shoe-bottom (i. e. innersole, outer sole). Accordingly this is one of the principal objects of my present invention. Another object resides in providing filler material of a compressible or plastic nature in the form of an external layer, preferably on both sides of a center or support. Several embodiments of this part of the invention are shown herein; and in my copending application Serial No. 232,279 I have shown and claimed other species, subordinate to the generic claims thereof herein contained. Although in all the respects thus far explained, my invention is best carried out by having the cementitious layers or plastic layers on both external sides, I wish it understood that certain broad claims herein are intended to cover a filler piece in which the cementitious layer or the plastic layer or both are on one side only of the supporting layer. Also, although my preferred construction employs a paper-like or non-extensible, sheet-like support or center, I intend certain of my claims to cover any kind of a strengthener, as for instance any one of the numerous forms of filler pieces employing strength giving or self-sustaining elements, disclosed in my various copending applications.

In the preferred embodiment of my invention the center or middle layer of paper or other sheet-like material is non-extensible and non-spreadable and hence gives the predetermined shape to the filler piece along with its own pre-determined thickness. The coating, preferably of a soft or at least sticky nature is on the outside. Preferably this is of such a nature that it will spread and compact while the outer sole is being pressed against the filler and rest of the shoe during the bottom levelling process. My improved filler piece is so constructed that in its application to the shoe the outside is held fast against shifting by being stuck directly and tenaciously and permanently to the inner side of the outer sole and of the shoe-bottom cavity. When this outer surface of the filler piece consists of a cement coating it tends to render the piece more permanent and ultimately more firm in the shoe. It renders the shoe-bottom more heat resisting as it changes to a firmer condition after its first application. In the indented or other pocket-like shape of holding the adhesive layer, the latter is rendered mechanically non-shifting or anchored in addition to its sticky properties. When the interior of the filler piece is of a plastic nature I preferably actually perforate the covering layer so that the outside cementitious laminæ reach through the perforations and thereby connects the plastic interior at a plurality of points directly with the outer sole and cavity bottom by means of the strong, permanent adhesion explained above so that no creeping or shifting of the filler is possible in the use of the shoe.

One of the principal objects of my present invention is to embody the leading advantages of my previous McKay filler pieces in a form so cheap that it can be used by the makers of even the lowest priced McKay shoes.

From the foregoing it will readily be understood that my invention is capable of a wide range of embodiments in the form of various practical filler pieces.

In the accompanying drawings I have illustrated my filler piece in the polygonal form shown and claimed in my application Ser. No. 192,076 above mentioned which angular form it is best adapted to, although I do not intend to restrict it thereto.

Figures 1 and 2 show respectively in plan and edge view one form of center support or shape giving layer;

Figure 3 is a plan view of a complete filler piece covered on the outside with filler material and having said center piece as the middle support;

Figure 4 is an enlarged sectional view of a simple embodiment of a finished filler piece;

Figures 5 and 6 are fragmentary sections of different forms of core, or central support before coating;

Figure 7 is a similar section of a more cushion-like filler piece;

Figure 8 shows in section a dipped piece;

Figure 9 shows in section the general construction of Fig. 7 compressed to final shape;

Figure 10 is a similar enlarged sectional view of a highly cushion-like piece;

Figure 11 is a plan view of the embodiment shown in Figure 5;

Figure 12 is a similar plan view of the embodiment shown in Fig. 6;

Figure 13 is a plan view of the embodiment shown in Figure 10.

Figure 14 is a further cross sectional view.

Figure 15 is a cross-section of a piece similar to Figure 9 except that it is wholly coated as in Figure 8.

Having first provided a center or middle layer 1, preferably of flat sheet-like material capable of giving shape, support, tensile strength, and integrity to the filler piece as an article of manufacture, I indent it or provide it with a series of grooves 2 or short button-like indentations 3, the former being made for instance by rolling the sheet between rolls containing V-shaped peripheral projections. Preferably these are not so shaped as actually to corrugate the sheet as the object is not to make the sheet ultimately distensible but is simply to indent the surface so as to contain pockets full of cement or other adhesive and so as to prevent shifting of the outside coating or layer whatever the latter may be. And in case the support is a single sheet the indentations preferably do not pass through, although actual holes or perforations come within the scope of my invention. The smaller and shorter depressions, pockets, perforations or adhesive-holding cavities 3 are made by passing the sheet beneath an embossing roll which indents or impresses the sheet permanently with sufficient indentations or openings to hold the cement in small masses as already explained, or in case the outside layer is regular cork filler it holds said cork filler so as to prevent any possibility of bunching or shifting in the course of the subsequent wear of the shoe. I refer to these holding pockets or grooves 2, 3, as indentations for the reason that their anchoring capacity is the function that I am relying upon for preventing bunching or shifting, and it will be understood that these may have varying depth or in fact go entirely through the central support 1 within the spirit and function of my invention, and I intend to include all such structures within the term indentations. The piece 1 having been indented as stated (preferably in the form of a large sheet before cutting into pieces) the cut out piece in its simplest form is then dipped or provided with an adhesive coating 4 of any of the kinds mentioned in my previous applications, such as glue, dextrine, or other quick acting, tough and strong adhesive or cement, preferably of a permanently adhesive nature. The range is large and it is sufficient to mention wax tailings, pitches, rubber cements and shoe waxes as such coating materials. Preferably the outer surface of the supporting sheet 1 is rough i. e. provided with fine indentations as indicated at 5 in order still further to aid the ultimate grip and adhesion of the cement on the sheet or layer in binding the outer sole and innersole together through the agency of said central supporting sheet 1, its anchored cement layer, and the other component parts, if any, of the filler piece. The foregoing constitutes one practical form of my invention in a simple embodiment thereof. If the simple form of Fig. 4 is used for shipment the cementitious layers 4 are such as to need quickening to become sticky.

A further development of the invention resides in providing the filler piece with compressibility and resilience or cushion quality. The cement covered piece 1 before the cement has set is sprinkled, dusted, or loaded in any way with a layer 6 of comminuted material preferably cork although chopped linters or other suitable fibrous material may be used, and then this layer, loose thereon, is rolled or otherwise compacted and driven through the cement or adhesive layer 4 thereby constituting a compact resilient layer or sheet-like lamina 7, Fig. 9, on the outside of the filler piece and not only stuck thereon but held thereon by its internal ribs 8 which now occupy the grooves 2 or other indentations 3 previously filled with cement only. In my subordinate copending application Serial No. 232,279 is disclosed a further development of that feature of the present invention distinguished by an external pad-like structure of spreadable filler material, the generic claims therefor being in the present case.

In Figure 10 I have shown a filler piece containing a body layer consisting of a middle layer 9 of plastic filler material and two supporting layers 10 perforated by straight holes 11 or by conical holes 12 for receiving the anchoring portions of the cement layer 4 as above explained and preferably covered by a comminuted resilient layer 7. This construction (Fig. 10) is provided where extreme resiliency is desired together with more compressibility and spreadibility, in which case instead of the relatively thick and preferably spongy layers 1, relatively thin layers 10 of paper or other tough skin-like material may be employed without departing from the spirit and scope of my invention. In my said copending application Serial No. 232,279, a further form of center support or tensile strength-giving element is shown. In connection with the dipping method of application hereinafter referred to, the holes 11 aid the softening, and hence spreadability, of the layer 9, especially if the piece consists only of the layers 9 and 10, or any of the laminated constructions of my copending applications; and I intend therefore to cover in my claims a perforated filler piece of any of these constructions and functions.

The various embodiments of the filler piece as thus far explained contemplate making the structure first in the form of a sheet and then cutting out the pieces therefrom after the laminated structure has been completed. In Fig. 8 I have shown a variation of the foregoing. Instead of making the entire structure as a sheet and then cutting it out I have formed the central support 1 with its indentations as a piece and then have dipped the same or otherwise treated it so as to get the various other laminæ or coatings thereon, with the result that they go entirely around the center or support so that said center 1 is all surrounded or enclosed in the final filler material and cementitious coating. In my said copending application Serial No. 232,279 is shown another construction or species where the center element is wholly surrounded by the spreadable element. Figure 8 also illustrates how any of the structures shown in the other figures may be made similarly so as entirely to surround the middle portion. For example, Figure 15 shows a piece substantially similar to that shown in Figure 9 except that the cementitious coating covers not only the two sides of the piece as shown at 7 but also the edges as shown at 7ª thus entirely surrounding and enclosing the middle element 1. Furthermore, in both Figs. 8 and 10 the piece contains elements not yet in their ultimate and predetermined relation or combination. In the subsequent bottom forming process the outside layer (and in Fig. 10 both the outer layer and the central layer) are combined or further combined or intermingled with the layers 4, 4. And in Fig. 10 the levelling pressure forcibly combines or forces together all three layers 7, 4 and 9. This is the case also with the construction shown in Fig. 9, especially if compacted only enough at first merely to hold the parts together but not intermingled or mixed to their ultimate extent. In Fig. 14 this predetermined intermingling is more intimate and direct. The cover layer or support 13 is of the frail type of my application Ser. No. 133,506 and my application Ser. No. 183,302 and the layer 9 is indicated as containing an extra amount of binder. Thus, in the bottom forming process the frail sheet 13 breaks or otherwise ceases to separate the layers on its opposite sides so that they are therefore commingled and, as shown for illustration, the perforations 11 in the thicker tougher supporting member 10 permit some of the binder to go through from the layer 9 and combine with the outside fragmentary lower layer 6. If the holes 11 are large and the ground cork or other comminuted material fine, more or less intermingling takes place in the opposite direction by the forcing of the fragmentary elements into the binder 9. All this is for illustrative purposes to make my description sufficiently comprehensive to present properly the broad nature of the invention. For example it will be understood that both of the cover layers 10 may be of the perforated variety or both may be of the imperforate variety 13 or may be of any of the various varieties of my copending filler piece applications. One object of the invention is to provide a filler piece which is self-sustaining and of such characteristics that it can be handled and treated according to my method as disclosed in my copending application Ser. No. 210,558 filed Aug. 4, 1927, and the Avery application Ser. No. 212,352, filed Aug. 11, 1927. The center 9, for example, may have not merely an excess of binder but may be wholly composed of binder (as set forth in my application Ser. No. 183,302). Such a core of pure binder is a layer of relatively stiff wax tailings, or any of the other meltable or plastic binders mentioned in my copending filler applications or patents. The coating 6 may be deposited directly on such internal layer 9, omitting in that case one or both of the layers 10, 13 and even so whether 9 is pure binder mixture of binder and body material. If both are omitted it will be understood that the stiff form of binder layer 9 will be used, serving the double function of a binder and also of a shape-giving or self-sustaining layer. The layer 6 is deposited when the binder layer 9 is sufficiently plastic or sticky to retain the comminuted or other body material 6. Reference is here made to my copending method application Ser. No. 228,588, filed October 25, 1927, and Serial No. 242,085, filed December 23, 1927 (which is derived in part from the present application) for further advantages and manner of use of the filler piece of the present application and for further explanation of the scope of the invention. My invention as already intimated makes possible and practicable the combining or intermingling of filler elements within the shoe-bottom cavity in predetermined manner and to predetermined extent or proportions. Also this may take place after the sole laying. From a practical standpoint, bearing in mind that one of my principal objects to to place in the hands of the manufacturer of the cheapest kinds of shoes, the most inexpensive and yet efficient filler possible, this construction of Figs. 7-14 permits the adequate protection, but without separate expense, of the sticky binder element until actual use. The sticky nature of filler has been the cause of much of the expense heretofore. Also my invention keeps substantially separate the dry body material and the sticky, plastic binder until they get into the shoe-bottom cavity. Likewise as before it enables the shoe manufacturer to use filler pieces which do not necessarily conform to the cavity in size or shape.

Having provided the filler piece as above explained either in its entire embodiment or in a less complete and more simple arrangement, the piece is applied directly, or preferably is simply dipped in water or other softening and quickening fluid as explained in my application Ser. No. 210,558 filed August 4, 1927 and the application of A. H. Avery Ser. No. 212,352 filed August 11, 1927 and applied between the innersole and outer sole. The rest of its functions are brought into action or use by the regular, further steps of the bottoming process in the further manufacture of the shoe. The hot water or other treatment develops the strong adhesiveness sufficiently to cause the filler piece to unite tenaciously and permanently the two opposing shoe-bottom members, outer sole and innersole. In case the simplest form of the filler piece as shown in Figs. 4-6, 11, 12 are used the central lamina 1 is instantly held in place and permanently so by the simple act of placing it there, because the sole laying and levelling process in the regular manufacture of the shoe brings the requisite pressure on the various parts of the shoe-bottom which causes every portion of the filler piece to be forcibly engaged by and compacted with and against all the adjacent portions of the shoe-bottom. In case the more complete embodiments of my filler piece as shown in Figs. 7-10, 13 and 14, are used the same permanent adhesion takes place for the same reasons, and in addition thereto a superior resilience and cushion-like effect are secured, together with impossibility of shifting and bunching because of the cementitious but interlocked or tied-together construction above explained. The grooves or indentations result in internal ridges or heaps 8 so as to give a mass effect at separated places (as likewise do the external ridges or masses 14) which permits or facilitates spreading of the cementitious layers, thereby accomplishing more intimate and better adhesion. In my concurrent applications Ser. No. 228,588 and Ser. No. 228,235 I disclose another means and method of securing segregated masses of cementitious material by means of external ridges of the same. External ridges or projecting segregated masses 14 illustrate this feature herein. In the process of making shoes the outer sole and the adjacent bottom of the shoe cavity are more or less in temper or damp at the time of filler laying and hence by providing a structure that compels the cement to be shifted laterally, with a spreading movement, the cement gets a better hold than if simply pressed perpendicularly against the leather surface with no lateral spreading movement flat-wise over said surface. One purpose of my present invention is to provide a filler piece which when placed in the shoe-bottom and then subjected to the bottom levelling pressure will compel the sticking movement and resulting strong adhesion just explained.

The present invention, in connection with those of the three method applications already mentioned, makes it practicable to employ spreadable material which is normally more stable or less shiftable in the finished shoe than previously possible. The holes 11 (when simply a plastic center 9 enclosed by perforated supports or shaped layers 10 constitutes the complete filler piece) transmit at numerous points the softening hot water or hot cement so that the naturally stiff intractable layer 9 is rendered spreadable. In other words, the construction of the piece, and particularly the holes 11 thereof, make it possible to temper the filler piece even though not of easily spreadable make-up. It is desirable to employ the latter stiff or non-shiftable structure, but this has not heretofore been possible. Even when these holes 11 are filled with cement, the latter when melted, accomplishes, but more slowly, the same tempering results on the layer 9. The cement when softened retains the heat longer than the water and hence keeps the softening or tempering action operative longer.

As already explained my invention is broadly novel in the particular features hereinafter covered by the claims and hence is capable of a wide range of embodiments without departing from the spirit and scope of the invention.

What I claim is:

1. A shoe filler piece having a predetermined, self-sustaining form adapted to occupy the cavity between the outer sole and innersole of a shoe-bottom, and comprising a body layer having indentations extending inwardly on at least one side and an external layer of cementing material anchored in said indentations for effecting the permanent adhesion of said piece flat against the adjacent surface of the shoe-bottom when occupying the aforesaid position therein.

2. A shoe filler piece having a predetermined, self-sustaining form adapted to occupy the cavity between the outer sole and innersole of a shoe-bottom, and comprising an internal layer for giving tensile strength, and external spreadable filler material surrounding said layer on its opposite sides and around its lengthwise edges.

3. A shoe filler piece having a predetermined, self-sustaining form adapted to occupy the cavity between the outer sole and innersole of a shoe-bottom, and having a laminated structure, comprising an internal layer having means for providing tensile strength and integrity, and an external layer of cementitious material interengaged therewith.

4. A sheet-like shoe filler piece having a self-sustaining, sheet-like form capable of occupying the cavity between the outer sole and innersole of a shoe-bottom, and having a laminated structure comprising a body layer, and an external layer of filler material tied together by a plurality of cementitious connections.

5. A sheet-like shoe filler piece having a self-sustaining, sheet-like form capable of occupying the cavity between the outer sole and innersole of a shoe-bottom, and having a laminated structure, comprising a body layer, and an external layer provided with ridges and consisting at least in part of cementitious material.

6. A sheet-like shoe filler piece having a self-sustaining, sheet-like form capable of occupying the cavity between the outer sole and innersole of a shoe-bottom, and having a laminated structure, including a sheet-like layer containing a plurality of perforations, and a layer of plastic shoe filler material on one side thereof.

7. A sheet-like shoe filler piece having a self-sustaining, sheet-like form capable of occupying the cavity between the outer sole and innersole of a shoe-bottom, and having a laminated structure, comprising a body layer, and an external layer of spreadable, plastic shoe filler material provided with ridges.

8. A sheet-like shoe filler piece having a self-sustaining, sheet-like form capable of occupying the cavity between the outer sole and innersole of a shoe-bottom, and having a laminated structure, comprising a plastic layer and enclosing, sheet-like, perforated, supporting layers and a cementitious layer on at least one of said supporting layers.

9. A self-sustained, sheet-like, laminated shoe filler piece comprising a plurality of distinct layers, some of which are plastic, united but constituting substantially separate and distinct strata of the piece prior to use, an intermediate one of the layers being adapted to become commingled with another layer by pressure to form mixed filler in the process of manufacture of the shoe bottom.

10. A laminated self-sustained sheet-like shoe filler piece composed of a plurality of filler elements united but constituting substantially separate and distinct parts of the piece prior to use, and having an excessive amount of body material in one lamina and an excessive amount of binder in another lamina, adapted to be mingled together to constitute mixed filler in the process of manufacture of the shoe-bottom.

11. A self-sustained, sheet-like shoe filler piece, having an internal excess of binder and an external excess of body material, both proportioned, arranged and adapted for commingling by pressure when in the shoe-bottom into a stable coherent permanent filler layer.

12. A self-sustained, sheet-like shoe filler piece, having binder and body material in substantially separated layers and in predetermined proportions but only partially combined with each other.

13. A self-sustained, sheet-like shoe filler piece, comprising binder and body material arranged in layers in predetermined proportions for constituting a proper shoe-bottom filler united but constituting substantially separate parts of the piece prior to use, the larger proportion of said binder being adjacent but not intermingled with the larger proportion of said body material, the two having a relation and arrangement permitting their proper intermingling in use in the shoe-bottom.

14. A self-sustained, sheet-like shoe filler piece, comprising binder and body material arranged in layers in predetermined proportions for constituting a proper shoe-bottom filler united but constituting substantially separate parts of the piece prior to use, the larger proportion of said binder being adjacent but not intermingled with the larger proportion of said body material, the two having a relation and arrangement permitting their proper intermingling by pressure in use in the shoe-bottom.

15. A self-sustained, sheet-like shoe filler piece, comprising binder and body material arranged in layers in predetermined proportions for constituting a proper shoe-bottom filler united but constituting substantially separate parts of the piece prior to use, the larger proportion of said binder adjacent but not intermingled with the larger proportion of said body material, the two having a relation and arrangement permitting their proper intermingling in use in the shoe-bottom, said binder having a plastic nature, at least prior to said intermingling treatment.

16. A self-sustained, sheet-like shoe filler piece, comprising binder and body material arranged in layers in predetermined proportions for constituting a proper shoe-bottom filler united but constituting substantially separate parts of the piece prior to use, the larger proportion of said binder being adjacent but not intermingled with the larger proportion of said body material, the two having a relation and arrangement permitting their proper intermingling in use in the shoe-bottom, said body material having a spreadable characteristic, at least prior to said intermingling treatment.

17. A shoe filler piece having a predetermined, self-sustaining form adapted to occupy the cavity between the outer sole and the innersole of a shoe-bottom, comprising an internal supporting and strength giving layer adapted to maintain the integrity of the filler piece during commercial handling, and an external layer of plastic, spreadable filler material on each side of the internal layer, adapted to spread under pressure in the shoe bottom cavity with reference to and beyond the edges of the internal layer.

18. A shoe filler piece having a predetermined self-sustaining form adapted to occupy the cavity between the outer sole and the innersole of a shoe bottom, comprising an internal supporting layer combined with plastic, spreadable, adhesive material at both sides of the supporting layer adapted under pressure within the shoe bottom cavity to spread beyond the edges of the supporting layer and to stick to the walls of said cavity on both sides of the supporting layer.

19. A shoe filler piece having a predetermined self-sustaining form adapted to occupy the cavity between the outer sole and the inner sole of a shoe bottom, and having a laminated structure comprising an internal strength giving layer, and a heat-plastic layer on each side of the strength giving layer containing cementitious binder capable of being melted and stuck under pressure against adjacent surfaces of the shoe bottom cavity for permanently cementing the piece in laid position in the shoe bottom.

20. A shoe filler piece comprising adhesive filler material, and internal tensile strength-giving means, said piece as a whole being capable of spreading under pressure and being compacted and united in a pad-like, self-sustaining, coherent piece for handling and use.

Signed by me at Boston, Mass., this 13th day of October, 1927.

ANDREW THOMA.